US009946675B2

(12) United States Patent
Biskup (10) Patent No.: US 9,946,675 B2
(45) Date of Patent: Apr. 17, 2018

(54) FAULT-TOLERANT LOOP FOR A COMMUNICATION BUS (71) Applicant: Atieva, Inc., Redwood City, CA (US)

(72) Inventor: Richard J. Biskup, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 324 days.

(21) Appl. No.: 13/801,936

(22) Filed: Mar. 13, 2013

(65) Prior Publication Data

US 2014/0281079 A1 Sep. 18, 2014

(51) Int. Cl.
*G06F 13/40* (2006.01)
*G06F 11/14* (2006.01)
*G06F 11/20* (2006.01)

(52) U.S. Cl.
CPC ...... *G06F 13/4022* (2013.01); *G06F 11/1423* (2013.01); *G06F 11/2007* (2013.01); *G06F 13/4068* (2013.01)

(58) Field of Classification Search
CPC .... G06F 11/07; G06F 11/0739; G06F 11/142; G06F 11/1423; G06F 11/10; G06F 11/2002; G06F 11/2007; G06F 13/40; G06F 13/4004; G06F 13/4022; G06F 13/4063; G06F 13/4068; G06F 13/4072; G06F 13/4086
USPC ............... 710/8–10, 104, 110, 305, 316, 317
See application file for complete search history.

(56) References Cited

U.S. PATENT DOCUMENTS

| 4,456,965 | A | | 6/1984 | Graber et al. |
| 4,623,884 | A | * | 11/1986 | Ihara ...................... H04L 12/437 370/224 |
| 4,688,183 | A | * | 8/1987 | Carll ....................... G08B 17/00 340/3.4 |
| 6,147,967 | A | * | 11/2000 | Ying ................... G06F 11/2242 370/222 |
| 6,363,066 | B1 | * | 3/2002 | Frimodig ....................... 370/360 |
| 6,421,710 | B1 | * | 7/2002 | Jasperneite et al. .......... 709/208 |
| 6,563,419 | B1 | * | 5/2003 | Herz ....................... H04B 3/50 340/12.15 |
| 6,944,695 | B1 | | 9/2005 | Tangen |
| 7,359,433 | B1 | | 4/2008 | Culca |

(Continued)

FOREIGN PATENT DOCUMENTS

| KR | 1020010062420 | 7/2001 |
| KR | 1020120055241 | 5/2012 |
| WO | WO 0139515 | 5/2001 |

OTHER PUBLICATIONS

The MOSSFET as a switch, <http://www.electronics-tutorials.ws/transistor/tran_7.html>, accessed Jan. 20, 2015.*

(Continued)

*Primary Examiner* — Thomas J Cleary
(74) *Attorney, Agent, or Firm* — Womble Bond Dickinson (US) LLP (57) ABSTRACT A communication bus system is provided. The communication bus system includes a communication bus having a plurality of isolatable segments and a bus master coupled to a first end of the communication bus. The bus master is configured to couple to a second end of the communication bus and to decouple from the second end of the communication bus based on a selection signal. A method for operating a communication bus is also disclosed.

20 Claims, 6 Drawing Sheets

(56) References Cited

U.S. PATENT DOCUMENTS

| | | | |
|---|---|---|---|
| 7,478,174 B2 * | 1/2009 | Ellerbrock | H04L 41/0681 709/249 |
| 7,523,239 B2 * | 4/2009 | Shimizu | H04L 12/40169 710/110 |
| 7,649,383 B2 | 1/2010 | Kobayashi et al. | |
| 7,746,114 B2 * | 6/2010 | Nagase | 326/82 |
| 7,893,717 B1 | 2/2011 | Meany et al. | |
| 8,231,996 B2 | 7/2012 | Howard et al. | |
| 8,244,838 B2 * | 8/2012 | Balasubramanian | G05B 19/0423 370/216 |
| 8,264,954 B2 * | 9/2012 | Santos | H04L 12/437 370/222 |
| 8,354,186 B2 | 1/2013 | Muis | |
| 8,487,689 B2 | 7/2013 | Floyd | |
| 8,586,230 B2 | 11/2013 | Kim et al. | |
| 8,719,477 B2 | 5/2014 | Kaneko | |
| 8,868,807 B2 | 10/2014 | Kashima | |
| 2002/0083255 A1 * | 6/2002 | Greeff | G06F 13/1684 710/305 |
| 2002/0108076 A1 * | 8/2002 | Barenys | G06F 11/221 714/43 |
| 2004/0225814 A1 | 11/2004 | Ervin | |
| 2005/0251608 A1 * | 11/2005 | Fehr et al. | 710/309 |
| 2006/0082222 A1 * | 4/2006 | Pincu | H02J 1/102 307/29 |
| 2006/0242350 A1 * | 10/2006 | Worley, Sr. | 710/305 |
| 2007/0103205 A1 | 5/2007 | Whetsel | |
| 2008/0195783 A1 | 8/2008 | Deshpande | |
| 2008/0270654 A1 | 10/2008 | Reberga | |
| 2009/0147673 A1 * | 6/2009 | Niigata | 370/225 |
| 2011/0093739 A1 * | 4/2011 | Bernon-Enjalbert | H04L 12/10 714/4.5 |
| 2011/0125945 A1 * | 5/2011 | Link et al. | 710/110 |
| 2012/0275527 A1 | 11/2012 | Douglass | |
| 2012/0287688 A1 | 11/2012 | Fornage et al. | |
| 2012/0324296 A1 * | 12/2012 | Hoffknecht | G06F 11/0745 714/48 |
| 2013/0052514 A1 | 2/2013 | Kim | |
| 2013/0124763 A1 * | 5/2013 | Kessler | 710/110 |
| 2013/0282941 A1 * | 10/2013 | van Dijk | 710/110 |
| 2014/0025999 A1 * | 1/2014 | Kessler | 714/43 |

OTHER PUBLICATIONS

P-channel Power MOSFETs Approach N-channel Performance, IXYS Corp, May 2009.*
Definition of Opto-Isolator, <http://en.wikipedia.org/wiki/Opto-isolator>, accessed Jan. 20, 2015.*
Optocoupler Tutorial, <http://www.electronics-tutorials.ws/blog/optocoupler.html>, accessed Jan. 27, 2015.*
Marais, Hein. "RS-485/RS-422 Circuit Implementation Guide". Application Note AN-960. Revision 0. 2008. Analog Devices, Inc.*
Goldie, John. "Failsafe Biasing of Differential Buses". Application Note 847. 1998. National Semiconductor Corporation.*
International Search Report, PCT/US2014/025560, dated Jun. 26, 2014.
International Search Report, PCT/US2014/025515, dated Jul. 8, 2014.
International Search Report, PCT/Us2014/024861, dated Sep. 18, 2014.
International Search Report, PCT/US2014/022807, dated Jul. 3, 2014.

* cited by examiner

FAULT-TOLERANT LOOP FOR A COMMUNICATION BUS

BACKGROUND

Communication buses are many and varied, as exemplified in computer backplanes, board buses, buses inside integrated circuits, bus standards, local area networks, wide area networks, and ad hoc and proprietary buses connecting devices. One bus in widespread use is the CAN (controller area network) bus, originally developed for vehicles. The CAN bus is a multi-master broadcast serial bus, which may be implemented using balanced pair signals in twisted-pair wires, optionally in shielded cables. Other buses may employ differential line drivers and differential receivers. Many buses support two states, "1" and "0", or three states, "1", "0" and "Z" or high impedance. Yet, components for many of these buses may be more expensive than desired, have complex protocols, or may not function well in harsh environments such as automotive. There is a need in the art for a solution which overcomes the drawbacks described above, and/or has features suited for a specific environment.

SUMMARY

A fault tolerant bidirectional bus system, and related method, are provided.

In one embodiment, a communication bus system is provided. The communication bus system includes a communication bus having a plurality of isolatable segments and a bus master coupled to a first end of the communication bus. The bus master is configured to couple to a second end of the communication bus and to decouple from the second end of the communication bus based on a selection signal.

In another embodiment, a communication bus system is provided. The communication bus system includes a communication bus having a ring topology and a bus master coupled to the communication bus. The bus master has a first switch configured to selectably break the ring topology while the bus master remains in communication with the communication bus. The communication bus system includes a plurality of bus slaves coupled to the communication bus, where each slave of the plurality of bus slaves has a switch configured to couple and decouple neighboring segments of the communication bus.

In yet another embodiment, a method of operating a communication bus is provided. The method includes decoupling from a first end of a communication bus. The method includes transmitting a message to one of a plurality of bus slaves via a second end of the communication bus, with the decoupling from the first end of the communication bus being maintained. The method further includes coupling to the first end of the communication bus.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The embodiments of the dual voltage communication bus provided herein have a two wire bus that is bidirectional, and various components that transmit and receive differential voltages on the bus. Twisted pairs, shielded pairs, shielded twisted pairs etc., can be used in the wiring of the bus. The bus can be used to connect a master and one or more slaves and is suitable for the operating environment of motor vehicles whether the vehicle be land, air or sea based. This application is related to US application Ser. Nos. 13/794, 535, 13/801,894, and 13/801,913 , each of which is incorporated herein by reference for all purposes.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
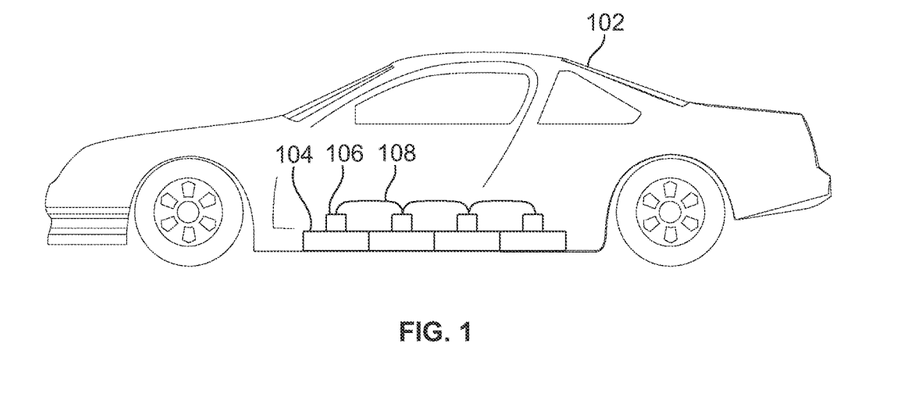
FIG. 1 is a schematic diagram of a communication bus connecting sensors on battery modules in an automobile in accordance with some embodiments.

FIG. 1 shows rechargeable battery application for a communication bus system in accordance with some embodiments. An automobile 102, which could be a hybrid or an electric car, has battery modules 104. On top of the battery modules 104, there are sensor modules 106, which monitor battery conditions, such as temperature and voltage. A communication bus 108 connects the sensor modules 106. The sensor modules 106 can track battery charging, discharging, lifespan, faults or other error or environmental conditions, and communicate these amongst themselves. Low-cost and operation under a variety of conditions, such as temperature, humidity, vibration, acceleration, deceleration, aging, etc., are desirable. The battery modules 104 may be connected in various parallel and serial arrangements, and have differing operating voltages, e.g., successively stacked serial modules with voltages up to 400 volts or more. Over time, components and connectors can age, a wire can break, component values and drive strengths can change, battery cells can go open circuit or short-circuit, and other fault conditions can arise. Signal noise can arise on the communication bus 108 from electromagnetic coupling of the bus to the wiring connecting the battery cells and the large surge currents of up to hundreds of amps in this wiring. Other industrial, commercial and consumer applications may have related or additional concerns and conditions, which a well-designed communication bus system may address. It should be appreciated that while automobile 102 is illustrated in this example, this is not meant to be limiting as any land, sea, or air based vehicle may integrate the bus design described herein.

Figure 2:
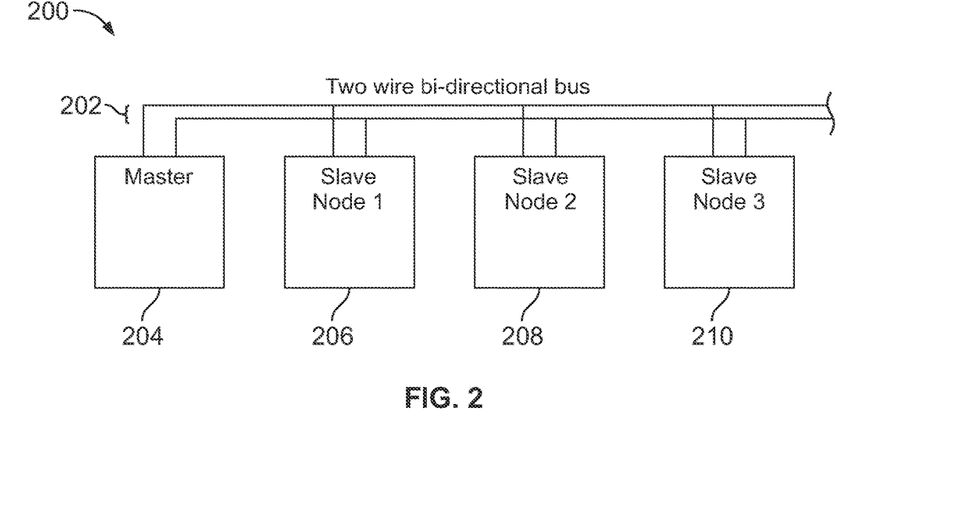
FIG. 2 is a schematic diagram of a bus master and bus slaves connected by a communication bus in accordance with some embodiments.

FIG. 2 shows a communication bus system 200 in accordance with some embodiments. Communication bus system 200 includes a two-wire bidirectional bus 202, a bus master 204, and bus slave nodes 206, 208, 210. The communication bus system 200 is suitable for the automotive battery application shown in FIG. 1, among other types of systems. The two-wire bidirectional bus 202 can be implemented as shown, with paired wires, shielded cable, shielded pairs, twisted pairs, or twisted pairs in shielded cable and other variations as readily devised. The two-wire bidirectional bus 202 supports differential voltages, as will be further described. A far end of the two-wire bidirectional bus 202 is shown as extendable. The total number of bus masters and bus slaves that can be coupled to the two-wire bidirectional bus 202 is dependent upon various factors such as capacitive loading, drive strength of the components, termination, length and impedance of the wiring, and signal timing. It should be appreciated that bus master 204 may be a controller, such as a microprocessor or programmable logic device, while slave nodes may be sensors in some embodiments.

Figure 3:
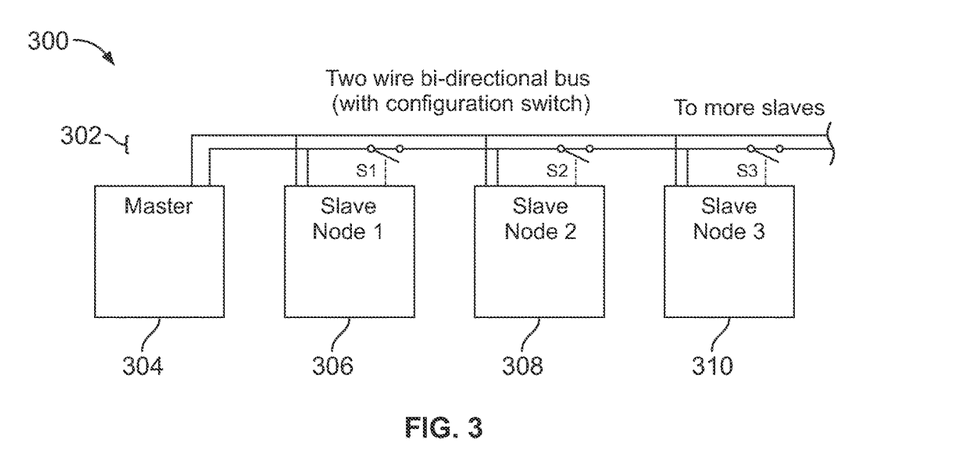
FIG. 3 is a schematic diagram of a bus master and bus slaves connected by a communication bus with switches in accordance with some embodiments.

FIG. 3 shows a communication bus system 200 having switches that provide galvanic isolation of slave nodes in accordance with some embodiments. A two-wire bidirectional bus 202 connects a bus master 204 and bus slave nodes 206, 208, 210. At each slave node, a switch S1, S2, S3 can activate to close or open to connect or disconnect the respective slave node along one of the wires of the two-wire bidirectional bus. Opening the switch S1 leaves a first bus slave node 206 coupled to the bus master 204 via the two-wire bidirectional bus 202, but disconnects downstream slave nodes, e.g., a second slave node 208 and a third slave node 210, etc., so that the downstream slave nodes 208 and 210, no longer communicate with the bus master 204. Similarly, opening the switch S2 leaves the second bus slave node 208 connected to the bus master 204 if the first switch S1 is closed, but disconnects downstream slaves, e.g., the third slave node 210, etc., so that the downstream slave nodes no longer communicate with the bus master 204. These actions and conditions can be repeated for further downstream slaves. The two-wire bidirectional bus 202 supports differential voltages. The switches S1, S2, S3 could be implemented using transistors of various types, or relays or other circuitry.

Figure 4:
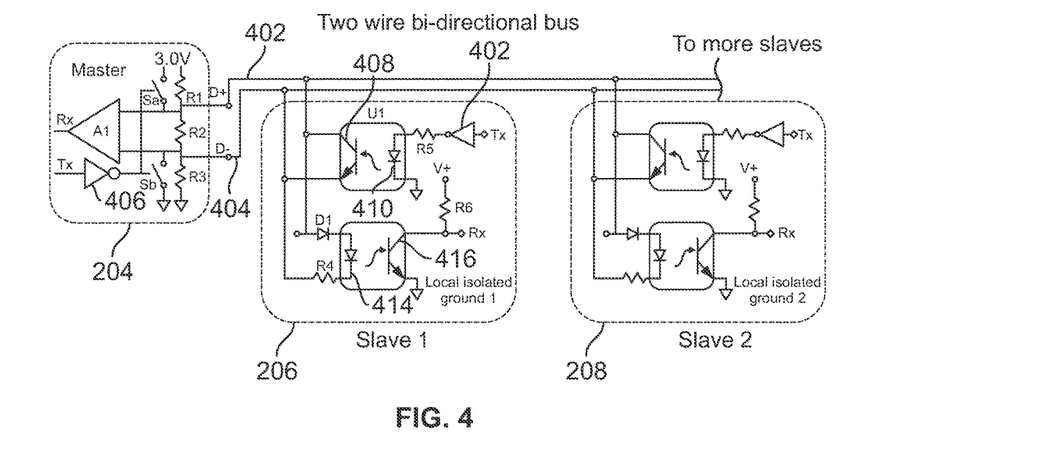
FIG. 4 is a schematic diagram of electronic circuitry in the bus master and bus slaves in accordance with some embodiments.

FIG. 4 shows an embodiment of electronic circuitry inside of the bus master 204 and the bus slave nodes 206, 208. A resistor ladder biases the two-wire bidirectional bus to a specified differential voltage, i.e., establishes the specified differential voltage on the bus, in the absence of driving by any transmitter onto the bus. In the embodiment shown, the resistor ladder establishes about 0.9 V on the bus at bus idle. The resistor ladder also provides a termination to the two-wire bidirectional bus, establishing a termination impedance of the bus. The resistor ladder has a first resistor R1 connected between a power supply voltage and the first wire 402 of the bidirectional bus, a second resistor R2 connected between the first wire 402 and the second wire 404 of the bidirectional bus, and a third resistor R3 connected between the second wire 404 and electrical ground, which may be a local ground terminal, for example, local to the bus master 204, or a system ground. In the embodiment shown, the resistor ladder is included in or otherwise associated with the bus master 204. However, the resistor ladder could be located elsewhere along the two-wire bidirectional bus in variations. Resistance for the resistors R1-R3 in the resistor ladder can be set at relatively low values for a low impedance bus, or higher for decreased drive strength requirements placed on the bus master 204 and the bus slave nodes 206 and 208. A low impedance bus, i.e., with low resistance values on the resistor ladder, generally supports higher frequency communication and greater noise immunity. One reason for the greater noise immunity is that a given current spike, from cross coupling, produces a lower voltage spike across a lower resistance value. A low impedance bus and small capacitive loading for each bus slave node added to the bus generally supports a higher number of bus slave nodes before signal rise and fall times degrade. In one example, the resistors in the resistor ladder each have about 300 to 360 ohms and the bus supports 100 kbps (kilobits per second) data rate serial communication.

Still referring to FIG. 4, a differential amplifier A1 is employed inside the bus master 204, to receive differential voltages from the two wires 402, 404 of the bidirectional bus. It should be appreciated that the term "wires" may be interchanged with the term "leads." The differential amplifier A1 is tuned to recognize a first specified differential voltage range as a logical zero, and a second specified differential voltage range as a logical one, and output these logical values on the Rx terminal of the differential amplifier A1. Various types of known differential amplifiers can be used with the embodiments described herein. An output terminal Rx of the differential amplifier A1 can be connected to the receiver input of a UART (universal asynchronous receiver transmitter), for the bus master 204. In the embodiment shown, the resistor ladder has resistor values selected to establish a specified differential voltage on the two-wire bidirectional bus that is received by the differential amplifier A1 as a logical one. In turn, the logical one is passed along to the receiver input of the UART, which interprets a logical one as an idle state or mark, in the absence of timed transitions to and from the logical zero state (which would indicate data transmission). The receive path of the bus master 204 thus receives differential voltages, as established by the resistor ladder, or transmitted by one of the bus slaves, and converts these differential voltages to logical zeros or ones via the differential amplifier A1, and expresses the logical zeros and logical ones on the Rx terminal.

Continuing with FIG. 4, inside the bus master 204, the transmit path takes logical zeros and logical ones from a Tx terminal, which may come from the transmitter output of the above-discussed UART and expresses them as differential voltages on the two wires 402, 404 of the bidirectional bus. The Tx terminal is configured to buffer the logical zeros and logical ones through a buffer 406, which can be an inverter as shown, and operating two switches Sa, Sb. The first switch Sa is connected between the power supply voltage and the first wire 402 of the bidirectional bus, and the second switch Sb is connected between the second wire 404 of the bidirectional bus and the ground terminal, which may be a local ground. In the version shown, a logical one arriving on the Tx input of the transmit path of the bus master 204 opens the switches Sa, Sb so that the bias value of the resistor ladder R1, R2, R3 is expressed as a differential voltage value on the two wires 402, 404 of the bidirectional bus. A logical zero arriving on the Tx input of the transmit path of the bus master 204 closes the switches Sa, Sb so that the full voltage spread from ground to the power supply voltage is expressed as a differential voltage value on the two wires 402, 404 of the bidirectional bus. The switches Sa, Sb can be implemented using transistors of various types, or relays or other circuitry. Control circuitry suitable for the polarity of the buffer 406 and the specifications of the switches Sa, Sb can be added in some embodiments. In variations, other values of differential voltage could be expressed for logical zeros or logical ones, other types of drivers could be used, or the switches could be replaced by three state buffers, and the circuitry can be devised or adjusted for these changes.

Continuing with FIG. 4, the transmit path of the bus slave 206 makes use of a switch 408 coupled across the two wires 402, 404 of the bidirectional bus. In this embodiment, when the switch 408 is open, the differential voltage on the bus remains at the bias value established by the resistor ladder. When the switch 408 is closed, the two wires 402, 404 of the bus are essentially shorted together by the switch 408 and the differential voltage value on the bus is close to 0 V (zero volts). In the version shown, the switch 408 is part of an optoisolator U1, and is implemented using a phototransistor. An optoisolator, also known as an optical isolator, generally includes an LED (light emitting diode) coupled optically to a phototransistor. A logical zero appearing on the Tx terminal of the bus slave 206 is inverted by an inverter 412, which provides a voltage across the resistor R5 and a current through the resistor R5 and through the LED 410. Photons from the LED 410 cause the phototransistor to turn on, which operate to close the switch 408. A logical zero in the transmit path of the bus slave 206 is thus expressed as an approximately 0 V differential voltage on the bidirectional bus. For example, one type of photo transistor has a nominal 5 mA sink capability when switched on, and the resistor ladder can have resistance values adjusted so that the phototransistor can sufficiently pull together the two wires 402 and 404 of the two wire bi-directional bus. A logical one in the transmit path of the bus slave node 206 is expressed as open or high impedance from the switch 408, so that the bias differential voltage value from the resistor ladder predominates (unless another transmitter is sending). In variations, other values of differential voltage could be expressed for logical zeros or logical ones, and other types of drivers or switches could be used, such as those discussed with regard to the bus master.

Still referring to FIG. 4, the receive path of the bus slave 206 has a differential amplifier U2 connected across the first wire 402 and the second wire 404 of the bidirectional bus. In the version shown, the differential amplifier U2 is implemented using an optoisolator, which has an LED 414 and a phototransistor 416. The LED 414 may produce photons in the infrared range, in a visual range, or an ultraviolet range, etc., and the phototransistor should be selected or matched to respond to the photons in the respective range. The optoisolator acts as a differential amplifier in the sense that the output of the optoisolator responds to various differential voltages as seen on the bidirectional bus. A diode D1 is connected between the first wire 402 of the bidirectional bus and the anode (positive) terminal of the LED 414, which effectively raises the turn on threshold of the circuit to two diode drops. A resistor R4 connected between the cathode (negative) terminal of the LED 414 and the second wire 404 of the bidirectional bus acts as a current-limiting resistor for the two diodes D1, 414 in series. A differential voltage of less than two diode drops on the bidirectional bus results in the LED 414 being off, no photons being generated by the LED 414, and the phototransistor 416 being in an off state. A resistor R6 connected to a local power supply voltage and in series with the phototransistor 416 has a receiver output terminal Rx at the junction between the resistor R6 and the phototransistor 416. When the phototransistor 416 is off, the receiver terminal Rx of the bus slave 206 shows a logical one, i.e., is close to the local power supply voltage. A differential voltage of greater than two diode drops on the bidirectional bus results in the LED 414 turning on, and photons being generated by the LED 414, which turns the phototransistor 416 to an on state. With sufficient current passing through the phototransistor 416, and depending on the value selected for the resistor R6, the receiver terminal Rx of the bus slave 206 shows a logical zero. Other types of differential amplifiers or other types of input circuits can be used in variations of the bus slave 206, as can different tunings for various differential voltages and logical values. For example, a differential amplifier with hysteresis could be used, as could MOSFETs, bipolar transistors, relays, common power supply and ground connections, other types or levels of biasing or polarity and so on. The use of optoisolators U1, U2 allows the bus slave 206 to have local ground and local power supply independent of the ground and power supply in the bus master 204. This is useful when the slave node 206 is applied to monitoring circuitry for battery cells that are connected in series, where DC (direct current) voltages can develop that may be slightly or greatly in excess of the power supply voltages of the master 204 or of other slave nodes. The second slave node 208 and other slave nodes can use identical circuitry, or can use variations in circuitry. Other types of isolation devices such as transformers or level shifting circuitry can be used in variations of the slave node 206.

Figure 5:
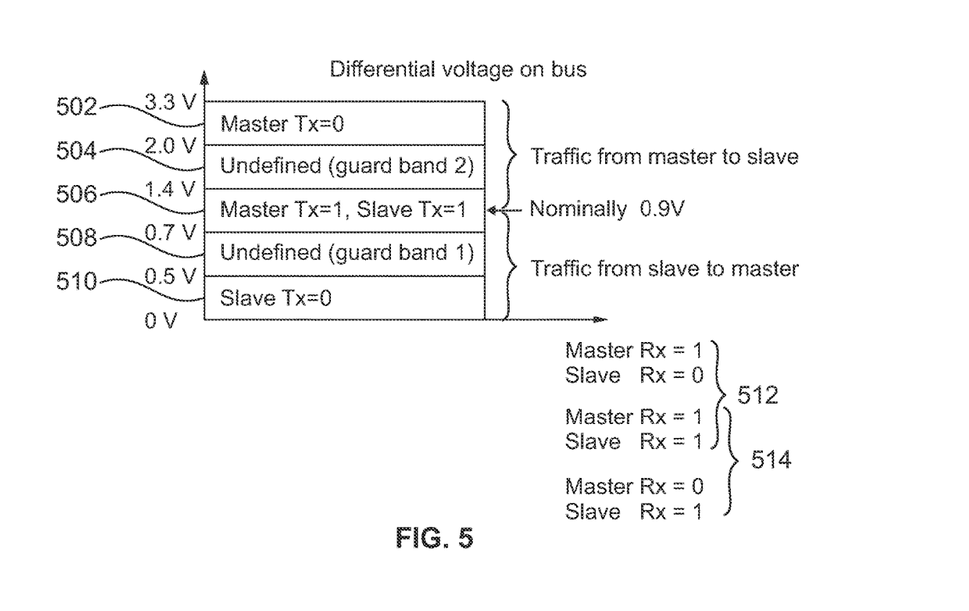
FIG. 5 is a voltage diagram of differential voltage levels, as applicable to the communication bus in accordance with some embodiments.

FIG. 5 is a diagram showing differential voltage levels as seen on the two-wire bidirectional bus of FIGS. 1-4. As generally understood, a differential voltage is said to be zero when the voltage on the first wire 402 (which may also be called D+ or V+) is approximately equal to the voltage on the second wire 404 (which may also be called D− or V−). The differential voltage is said to be greater than zero when the voltage on the first wire 402 is greater than the voltage on the second wire 404. Absolute voltage on the first wire 402 or the second wire 404 can be compared to a reference voltage, such as a ground voltage which may be local or global. The differential voltage values shown are selected for a specified embodiment, and can be adjusted, or used as relative or absolute voltage values, for further embodiments.

Voltages in a first voltage range 512 are transmitted from a bus master to one or more bus slaves. The first voltage range 512 includes a first voltage sub range 502 and a second voltage sub range 506. Voltages in a second voltage range 514 are transmitted from a bus slave to the bus master. The second voltage range 514 includes the second voltage sub range 506 and a third voltage sub range 510. That is, the first voltage range 512 and the second voltage range 514 overlap. The overlap of the first voltage range 512 and the second voltage range 514 includes the second voltage sub range 506. Both the first voltage sub range 502 and the third voltage sub range 510 are arranged outside of this overlap.

The first voltage sub range 502 is for a differential voltage value of between 3.3 V and 2.0 V, inclusive. The first voltage sub range 502 is expressed as a differential voltage on the bidirectional bus when the bus master is transmitting a logical zero. The first voltage sub range 502 is received by a bus master receiver as a logical one, and received by a bus slave receiver as a logical zero. The second voltage sub range 506 is for a differential voltage value of between 1.4 V and 0.7 V, inclusive. The second voltage sub range 506 is expressed as a differential voltage on the bus when the master is transmitting a logical one, a slave is transmitting a logical one, or neither a master nor a slave is transmitting, i.e., the bus is idle. The second voltage sub range 506 is received by a bus master receiver as a logical one, and received by a bus slave receiver as a logical one. The third voltage sub range 510 is for a differential voltage value of between 0.5 V and 0 V, inclusive. The third voltage sub range 510 is expressed as a differential voltage on the bus when a slave is transmitting a logical zero. The third voltage sub range 510 is received by a bus master receiver as a logical zero, and received by a bus slave receiver as a logical one. In further embodiments, the voltage levels shown in FIG. 5 could be absolute voltages, or relative voltages, applied to a two-wire bidirectional bus with one of the wires being ground or other reference voltage and the other of the wires being a signaling wire. Voltage polarities could be reversed for one of the voltage ranges, or equivalently the differential voltage could be a negative voltage for one of the voltage ranges.

Although other differential voltage value assignments and logical value assignments can be made and operated successfully on the two-wire bidirectional bus, the differential voltage values and logic value assignments shown herein have powerful properties in the communication of the bus system described herein. For example, serial communication can readily be used in the bus system, with the bus master having a UART and each of the slave nodes having a respective UART. When none of the UARTs is transmitting data, all of the UARTs are sending out an idle or mark state, which is a logical one. This is expressed as a voltage in the second voltage sub range 506, which is received by the master receiver as a logical one and received by the slave receiver as a logical one. All of the UARTs will be looking for a logical zero start bit, during this idle state. When the bus master starts transmitting, the bus master sends the start bit as a logical zero expressed as a voltage in the first voltage sub range 502 on the bus, which is received by the bus master receiver as a logical one and is received by the receivers of the respective slave nodes as a logical zero. The bus master receiver is thus not disturbed by bus master transmission as the bus master does not see its own transmissions and the bus master does not monitor the bus for bus slave traffic while the bus master is transmitting in some embodiments. It should be appreciated that the transmission from the bus master overpowers any transmission from a bus slave in some embodiments. All of the bus slave nodes (unless disconnected from the bus) receive or see the first voltage sub range 502 as a logical zero or start bit, and begin receiving serial data from the bus master. The bus master is enabled transmit to all of the slaves, but not bother receiving the bus master's own transmission. Logical zeros and logical ones sent by the bus master are experienced by the bus master receiver as all being logical ones, keeping the bus master receiver in the idle state.

In the reverse direction, when a bus slave node starts transmitting, the bus slave node sends the start bit as a logical zero expressed as a voltage in the third voltage sub range 510 on the bus, which is received by the receivers of respective bus slave nodes as a logical one and is received by the bus master receiver as a logical zero. The receivers of the bus slave nodes are thus not disturbed by a bus slave node transmission, and can continue to look for data being sent by the bus master. The bus master (unless disconnected from a bus slave that is transmitting) receives or sees the third voltage sub range 510 as a logical zero or start bit, and begins receiving serial data from the bus slave node. The bus slave node can thus transmit to the bus master, but not bother receiving the bus slave's own transmission. Other bus slave nodes also do not bother receiving the transmission from the bus slave node. Logical zeros and logical ones sent by the bus slave node are experienced by the bus slave receivers as all being logical ones, keeping the bus slave receivers in the idle state. With this arrangement of bus values, the bus master can broadcast to all of the bus slave nodes, i.e., operate in broadcast mode, and a single slave node can communicate back to the bus master in response. Communication processing is minimized, as the bus master receiver does not have to look at transmissions by the bus master transmitter and the bus slave receivers do not have to look at transmissions by other bus slaves. It should be appreciated that this reduces processing overhead overall.

Selection of the first, second and third voltage sub ranges 502, 506, 510 can confer a directionality to the communications, as discussed above. When the first voltage sub range 502 is observed on the two-wire bidirectional bus, communication is from the bus master to the bus slave nodes. When the third voltage sub range 510 is observed on the two-wire bidirectional bus, communication is from a bus slave node to the bus master. In one embodiment, various component values are adjusted (i.e., components selected) so that the master can "win" the bus if a rogue slave node is communicating when it shouldn't be. For example, with reference to FIG. 4, the closed-switch impedances of the switches Sa, Sb of the bus master 204 can be selected at a value lower than the closed-switch impedance of the switch 408 of the bus slave 206, so that the bus master 204 can express a differential voltage within the first voltage sub range 502 on the bus even if a bus slave 206 is attempting to express a differential voltage within the third voltage sub range 510 on the bus.

The communication bus system described herein achieves a low-cost, bidirectional, half duplex operation over a two wire interface, with advantages provided by the various embodiments. The bus master, and each of the bus slaves nodes, acts as a transceiver for a commonly available UART as found with many microcontrollers. Optoisolators in the bus slave provide galvanic isolation. For example, each bus slave can be operated with a different local power supply such as by connecting to local battery cells, even when the battery cells are stacked in series. Further, if one of the bus slaves experiences a local power supply failure, such as a battery cell going dead, this does not disrupt communication between the bus master and the remaining bus slaves. Differential signaling provides high immunity to common mode noise. In addition, guard band 1 508 and guard band 2 504 are provided to offer a buffer for any noise in the system. It should be appreciated that the ranges for the guard bands 504 and 508, as well as the other voltage ranges of FIG. 5, are illustrative and not meant to be limiting as any suitable ranges may be selected to achieve the functionality described herein. The optoisolators also provide high immunity to common mode noise. Signaling voltages that are kept positive, i.e., no negative differential voltages, do not reverse bias the emitter-base junction of the phototransistor in the optoisolator U1 of the bus slave node. This avoids hot carrier injection, which is known to degrade the gain of a phototransistor. The circuits shown herein operate as a transceiver for commonly available UARTs. The circuits are relatively insensitive to bus loading, allowing stable performance as additional bus slaves are added to the bus.

Figure 6:
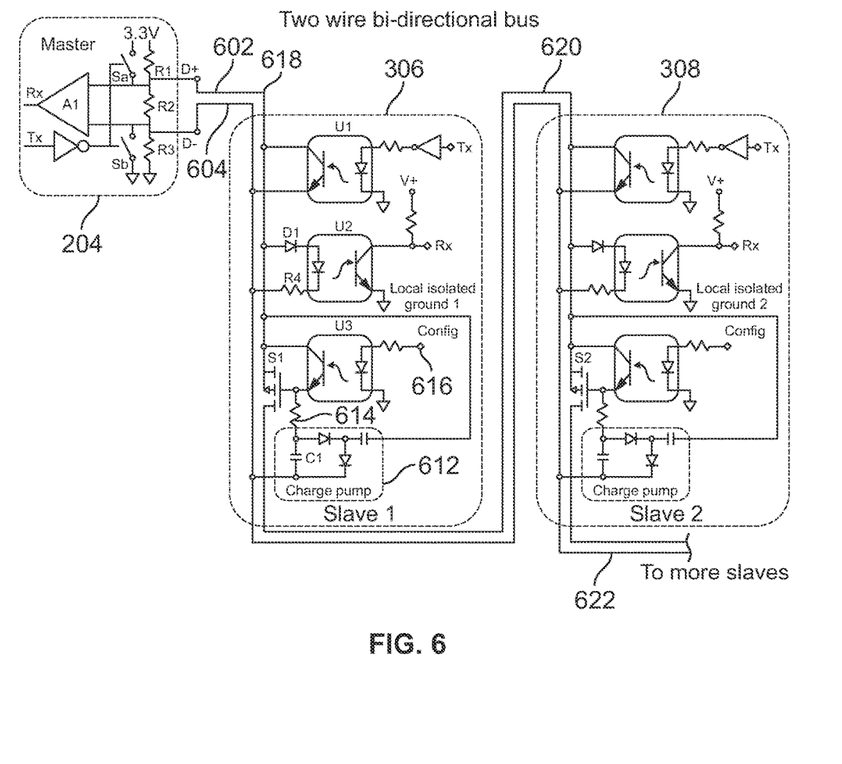
FIG. 6 is a schematic diagram of electronic circuitry in the bus master and bus slaves in accordance with some embodiments.

FIG. 6 shows the electronic circuitry inside of a bus master 204 from FIG. 2 and bus slaves 306, 308 from FIG. 3, in an embodiment of the communication bus system. A switch S1 is added to the bus slave 306. Each slave has a similar switch in some embodiments. The switch allows a slave to controllably couple and decouple a downstream segment 620 of the two-wire bidirectional bus and an upstream segment 618 of the two-wire bidirectional bus. In this version, the switch S1 is implemented by a PMOSFET that couples the upstream segment 618 of wire 602 of the two-wire bidirectional bus to the downstream segment 620 of the wire 602. Specifically, the source terminal of the switch S1 is connected to the upstream portion and the drain terminal of the switch S1 is connected to the downstream portion of the wire 602. Here, upstream and downstream are relative to the bus slave 306, and are relative to the switch S1 in the particular bus slave 306. A second bus slave 308 has a similar switch S2, which can couple an upstream segment 620 and a downstream segment 622 of the two-wire bidirectional bus. It should be appreciated that segment 620 of the bidirectional bus is downstream for an upstream bus slave 306 and is upstream for a downstream bus slave 308. A similar statement can be made about other segments of the bidirectional bus relative to other bus slaves. Generally, upstream means closer to the bus master 204, and downstream means further away from the bus master 204. Segment 622 of the bus, as shown in FIG. 6, can be connected to additional bus slaves, whereupon this segment 622 of the bus would be an upstream segment to those bus slaves.

A switch control is included in the bus slave 306. In this embodiment, the switch control includes an optoisolator U3 and a resistor 614. Power for the switch control is provided by a charge pump 612, which is coupled to the two-wire bidirectional bus. Other types of switches, such as bipolar transistors of various types, MOSFETs of various types, relays and so on can be used in variations. Other types of switch controls are readily devised. The charge pump includes a capacitor C1 coupled to one wire 604 of the two-wire bidirectional bus. The capacitor is coupled to two diodes in series, the second of which connects to the wire 604 of the two-wire bidirectional bus. At the junction of the capacitor C1 and the first diode, the charge pump connects to one end of the resistor 614 that connects to the gate terminal of the switch S1. At the junction between the two diodes of the charge pump, a capacitor has one terminal connected. The other terminal of the capacitor connects to the wire 602 of the two-wire bidirectional bus. As the two wires 602, 604 of the two-wire bidirectional bus show activity, with differential voltages of various magnitudes being expressed by serial data from either the transmitter of the bus master 204 or one of the transmitters of the bus slaves 306, 308, the charge pump operates to pump down the end of the resistor 614 and the gate terminal of the switch S1 to a negative voltage, relative to the source terminal of the switch S1. In this manner, the charge pump provides electrical power to the switch control. This action turns on the switch S1, in the embodiment where switch S1 is a PMOSFET, so long as a switch in the optoisolator U3, i.e., a further switch in the switch control, is not electrically shorting the gate terminal and source terminal of the switch S1 to each other. With the switch S1 closed, the upstream and downstream segments of the bidirectional bus are coupled together by the switch S1. When the switch control shorts together the gate and source terminals of the switch S1, the gate to source voltage becomes approximately 0 V and the switch S1 is turned off, which opens the switch S1 and decouples the upstream and downstream segments of the bidirectional bus. It should be appreciated that the operation of switch S1 is described for the implementation of switch S1 as a PMOSFET for illustrative purposes and not meant to be limiting.

The switch control responds to a blocking signal 616, which may also be called a configuration signal. When the blocking signal 616 is active, the LED in the optoisolator U3 is turned on. Photons from the LED in the optoisolator U3 then turn on the phototransistor in the optoisolator U3, which electrically shorts the gate and source terminals in the switch S1, thereby turning switch S1 off when implemented as a PMOSFET. This action by the turned on phototransistor disables and discharges the charge pump. Conversely, when the blocking signal 616 is inactive, i.e. off, low or a logical zero, the LED and phototransistor in the optoisolator U3 are off, and the gate and source terminals of the switch S1 are not electrically shorted together. This allows charge to build on the gate terminal of the switch S1, as provided by the charge pump 612. In this version, the charge is negative, which expresses a negative voltage on the gate terminal of the switch S1, thereby turning on switch S1 when implemented as a PMOSFET.

Other types of charge pumps and couplings of charge pumps to the switch control can be used in variations. For example, voltage doublers, voltage triplers, positive voltage pumps, negative voltage pumps and so on can be devised and employed as needed for various types of switches. These may be useful to overcome leakage at higher operating temperatures. An active charge pump could open the switch, or close the switch. A charge pump disabled by the switch control could close the switch, or open the switch. Software could send a series of ones and zeros from the bus master out on the bus in order to drive the charge pumps of the bus slaves into developing their respective negative voltages, prior to activating the blocking signal 616. One way to do this would be to send "55" or "AA" (hexadecimal) characters from a UART coupled to the bus master.

Once the blocking signal 616 is activated, segments of the bidirectional bus are decoupled from one another. The bus master can then participate in an iterative process of sending an identifier to a bus slave, which accepts the identifier and couples the next downstream segment of the bidirectional bus to the previously coupled segments. The sending, accepting and coupling are iteratively repeated, with a unique identifier for each iteration until all switches are closed. Operating a bidirectional bus in this manner serves to assign unique identifiers to respective segments of the bidirectional bus. In one embodiment, each identifier is associated with and assigned to a bus slave coupled to a respective segment of the bidirectional bus. When a bus slave accepts the identifier, that bus slave then couples the next segment of the bidirectional bus to the present segment of the bidirectional bus, i.e., to the respective segment of the bidirectional bus to which the bus slave is presently coupled. In this manner, through iterative identifier assignments and bus segment couplings, the bus slaves are switched in, one by one, each receiving a unique identifier and switching in the next bus slave, until all bus slaves have identifiers and are in communication with the bus master.

The bidirectional bus system shown in FIGS. 3 and 6 (see also FIG. 7, described below) provide a mechanism that allows a master, communicating over a broadcast bus, to direct broadcast traffic to a single slave, and assign an identifier to that slave. This obviates the need to preprogram slaves with preassigned identifiers during manufacture, to maintain inventories of preprogrammed slaves with preassigned identifiers, or to design in and mechanically set switches on circuit boards in order to assign identifiers to bus slaves. The bus switches can open to block communication to downstream bus slaves, while allowing a most recently switched in bus slave to grab the next identifier and connect the next bus slave in an iterative process. In one embodiment, a first bus slave is coupled to a bus master, without any switches intervening between the master and the first bus slave. That way, when the switches are open, the first bus slave can receive the first identifier then close a first switch and couple in a second bus slave. When the bus master broadcasts the second identifier, the first bus slave refuses a new identifier but the second bus slave accepts the identifier, then closes a second switch couples in a third bus slave, and so on. Diagnostics software may be integrated with the embodiments described herein. For example, the bus master or a controller could maintain a software map of identifiers and a physical order and/or location of the bus slaves in non-volatile memory. Diagnostics software could then determine whether identifiers are missing or changed in the slaves.

Figure 7:
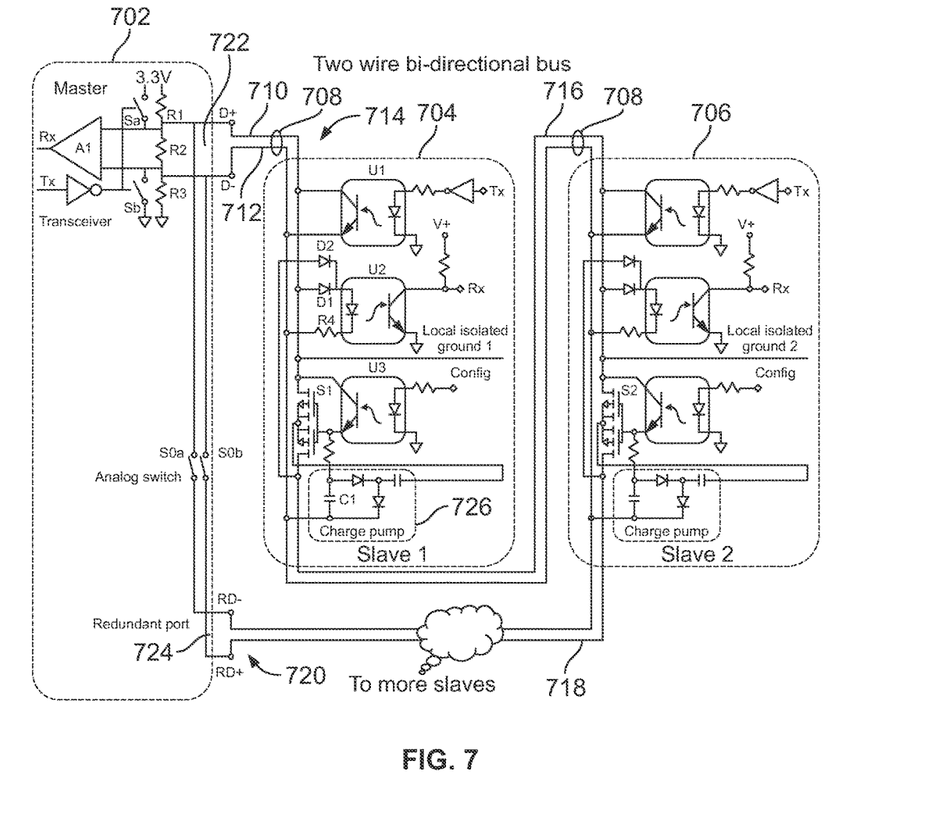
FIG. 7 illustrates a variation of the two-wire bidirectional bus along with modifications to the bus master and bus slaves in accordance with some embodiments.

In FIG. 7, a variation of the two-wire bidirectional bus is shown, along with modifications to the bus master and bus slaves of FIG. 6 in accordance with some embodiments. The two-wire bidirectional bus 708 of FIG. 7 has a first end 714 coupled to a first or main port 722 of the bus master 702 and a second end 720 coupled to a redundant port 724 of the bus master 702. The bus master 702 can selectively couple to the second end 720 of the two-wire bidirectional bus 708 via a switches S0a and S0b coupled to the main port 722 and the redundant port 724. The switches S0a and S0b could be internal to the bus master 702 or external to the bus master. In some embodiments, a single switch coupled to the RD-line may be utilized. As shown, the first end 714 of the two-wire bidirectional bus 708 couples to the receiver and transmitter (i.e., transceiver) of the bus master 702. The switches S0a and S0b couples to the receiver and transmitter of the bus master 702 and couples to the redundant port 724 of the bidirectional bus 708. Thus, opening the switches S0a and S0b decouples the second end 720 of the bidirectional bus 708 from the bus master 702, and closing the switches S0a and S0b couples the second end 720 of the bidirectional bus 708 to the bus master 702. Alternatively, the two-wire bidirectional bus 708 can be considered to have a ring topology, with the switches S0a and S0b connected so as to break the ring or make the ring. That is, when the switches S0a and S0b are open, the ring is broken, and when the switches S0a and S0b are closed, the ring is completed.

The switches S0a and S0b can be implemented as an analog switch, which passes current and allows voltages on both sides of the switch to track each other when the switch is closed in dome embodiments. For example, the switches S0a and S0b can be implemented using transistors of bipolar or MOSFET types, or relays. In the embodiment shown, the switches S0a and S0b include a double pole switch, connecting to both wires of the two-wire bidirectional bus 708. When the switches S0a and S0b are open, the bus master 702 can communicate to the bus slaves 704, 706 via the first end 714 of the two-wire bidirectional bus 708. If the first bus slave 704 has an open switch S1, the bus master will be communicating only with the first bus slave 704, as the second and subsequent bus slaves will be decoupled from the bus. It should be appreciated that switches S0a and S0b may be activated based on a signal provided to a gate of the transistors of the switches and that this signal may be referred to as a selection signal.

When switches S0a and S0b are closed, the bus master 702 can communicate to the bus slaves 704, 706 via the second end 720 of the two-wire bidirectional bus 708. As will be further explained further below, if there is a fault in the two-wire bidirectional bus 708 this configuration adds an optional communication route. A fault could include a broken wire, a disconnected connector or other break along the two-wire bidirectional bus 708. If such a fault cuts off communication between the bus master 702 and one or more of the bus slaves via the first end 714 of the two-wire bidirectional bus 708, the bus master 702 can communicate in a reverse direction via the second end 720 of the two-wire bidirectional bus 708.

In the bus slave 704 of FIG. 7, the switch S1 that couples and decouples segments of the two-wire bidirectional bus 708 can be implemented with two back-to-back PMOSFETs, controlled by an optoisolator U3 and a charge pump 726. One terminal of the charge pump 726 is connected to the lower voltage wire 712 of the two-wire bidirectional bus 708, and the other terminal of the charge pump 726 is coupled to the body of the back-to-back PMOSFETs. It should be appreciated that the two back-to-back PMOSFETs allow the switch S1 to be bidirectional, and prevent back flow of current through the body diode of either PMOSFET. The charge pump is connected to the midpoint of the two PMOSFETs so that the charge pump can "see" a data signal from the bus master, from either bus slave port via the body diode of the PMOSFET.

The received function of the bus slave 704 is made symmetrical in regards to the communication ports of the bus slave by the addition of the diode D2. The optoisolator U2 can thus see data from the bus master from either side of the switch S1 by way of the diodes D1 and D2. The diode D2 thus acts as a bypass device for data communication arriving on the opposing side of the switch S1. As shown in FIG. 7, the diode D2 is coupled from the more positive voltage wire of one segment of the communication bus to one of the terminals of the receiver, specifically to the positive terminal of the photodiode in the optoisolator U2, in the bus slave 704. Another diode D1 is coupled from the more positive voltage wire of another segment of the communication bus to the same terminal of the receiver. These two segments of the communication bus are coupled and decoupled by the switch S1 bus slave 704. Other types of bypass devices, such as transistors, switches and other circuits could be used in variations.

Continuing with FIG. 7, a first bus slave 704 is coupled to a first end 714 of the two-wire bidirectional bus 708, and can couple and decouple the first end 714 and a segment 716 of the bus by closing and opening a switch S1. A second bus slave is coupled to a segment 716 of the bus and can couple and decouple two segments 716, 718 of the bus by closing and opening a switch S2. Further bus slaves may be coupled to the segments of the bus downstream of the second bus slave 706. The bus master 702 decouples from the second end 720 of the bus, and remains coupled to the first end 714 of the bus. At power up, all bus slaves 704, 706 close their respective configuration switches, allowing all bus slave nodes to see traffic from the bus master 702 in some embodiments. All bus slaves are in an un-configured state with no ID (identification) number assigned. The bus master then opens the switch S0, which forces subsequent configuration traffic to follow a path from the bus master 702 main port 722 to the bus slaves, via the first end 714 of the two-wire bidirectional bus 708.

Next, the bus master 702 issues a command to instruct all bus slaves to enter configuration mode. Upon receiving this command, all bus slaves 704, 706 open their respective configuration switches S1, S2, blocking communication from the bus master 702 to downstream bus slaves. The bus master 702 then sends a message that instructs any un-configured bus slave to accept an included ID number and exit configuration mode, by closing the respective configuration switch of the bus slave. The first time this step is executed, only the first bus slave 704 hears this message from the bus master 702. As a result, the first bus slave 704 is the only bus slave that gets configured to this unique node ID. Each ID assignment command is acknowledged by the targeted bus slave.

The bus master repeats these actions, sending an unique ID number each time to the next downstream bus slave, which then accepts the ID number and connects the next downstream bus slave, until the expected number of bus slaves have been configured. If an expected bus slave does not respond with an acknowledgment, this indicates a bad connection between the last configured bus slave and the non-responding bus late. The bus master 702 then closes the switches S0$a$ and S0$b$ and iteratively assigns node IDs in the reverse order, starting with the bus slave closest to the bus master 702 redundant port 724. After all bus slaves have been assigned an ID, the bus master closes the switches S0$a$ and S0$b$. Also, at this point, all bus slave configuration switches will have been closed, and the bus is ready for normal traffic.

During normal operation, the redundant communication path through switches S0$a$ and S0$b$ to the transceiver of the bus master 702 provides fault tolerance from an open circuit, such as resulting from a mechanical failure or electrical contact corrosion. During normal operation, when there is no fault in the communication bus, the data signal on both the main port 722 and the redundant port 724 is identical. This is because during normal operation, bus slave 704, 706 switches S1, S2, etc., are all closed, so the communication bus can be considered to be a continuous two-conductor cable, with each bus slave tapping into this. The switches S0$a$ and S0$b$ thus provide a redundant connection to each bus slave.

Figure 8:
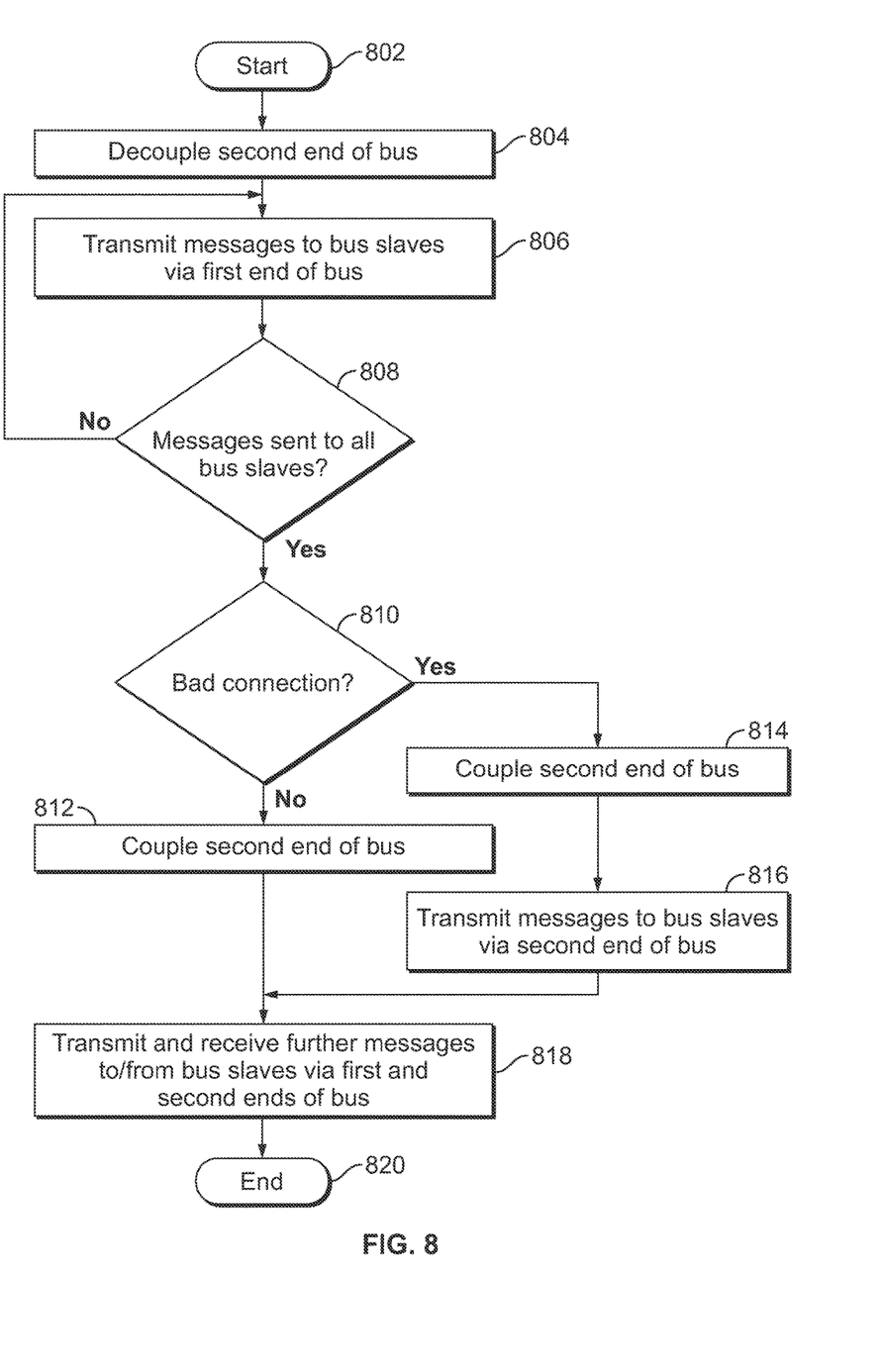
FIG. 8 is a flow diagram of a method of operating a communication bus having switches, as shown in FIGS. 3 and 7.

FIG. 8 shows a method of operating a communication bus, which may be practiced using embodiments shown in FIG. 3 and FIG. 7 or variations thereof. The method is presented from the viewpoint of a bus master or other agent such as a processor or controller acting upon the communication bus. After entering at a start point 802, the second end of the bus is decoupled, in an action 804. This can be accomplished with reference to FIG. 7, by opening the switches S0$a$ and S0$b$ of the bus master 702, decoupling the second end 720 of the bus from the bus master 702, leaving the bus master 702 coupled to the first end 714 of the bus. Starting a loop, messages are transmitted to the bus slaves via the first end of the bus in an action 806. In one version, these messages include configuration messages and are transmitted one at a time, to subsequent bus slaves, and each message contains an unique ID for the next unassigned bus slave to accept. With downstream bus slaves decoupled, the first message with the first ID is received by the first bus slave. The first bus slave accepts the ID and sends an acknowledgment message, which is received by the bus master. Before or after doing so, the bus slave closes the bus slave switch, which couples in the next bus slave. These actions repeat in the loop, which branches according to the action 808.

In decision operation 808, it is determined whether messages have been sent to all the bus slaves. If the answer is no, messages have not yet been sent to all the bus slaves, flow returns to the action 806 and repeats the loop until messages have been sent to all bus slaves. If the answer is yes, messages have been sent to all of the bus slaves, flow exits the loop and continues to decision operation 810. In decision operation 810, it is determined if there is a bad connection. For example, a determination as to the presence or absence of a bad connection could be based upon whether or not a response has been received from a bus slave after an ID has been sent to the bus slave for configuration. If no acknowledgment is received by the bus master, the bus master can assume there is a bad connection. Another way that this determination could be made is to poll each slave using each ID in a sequence, and determine whether each slave has replied. A lack of a reply, for a specified ID, would indicate a bad connection. If the answer is, no, there is no bad connection, flow continues to the action 812, in which the second end of the bus is coupled. This can be accomplished by closing the switches S0$a$ and S0$b$ of the bus master 702 with reference to FIG. 7.

If the answer is, yes there is a bad connection, flow continues to the action 814, in which the second end of the bus is coupled. Action 814 is followed by action 816, in which messages are transmitted to the bus slaves via the second end 720 of the bus. In one version, these messages include configuration messages and unique IDs and are transmitted one at a time, in reverse order to the bus slaves, starting with the most downstream bus slave, i.e. the bus slave closest to the second end of the bus. Transmitting unique IDs in reverse order could be accomplished using a loop, a decremented index (e.g., in place of an incremented index formerly used when transmitting unique IDs in a forward order via the first end of the bus) or a pointer and a branching question. Even though the switch S2 of the bus slave is still open as a result of the bus slave not yet having accepted an identifier and not yet having closed that switch, the communication can get to the receiver of the bus slave via the added diode D2 of FIG. 7, acting as a bypass device and routing the communication past the open switch.

It is generally understood that actions in a method may be performed in different orders or merged in variations of the method. For example, the determinations in decision operations 808, 810 could be combined or asked in reversed order.

Finding a lack of an acknowledgment message could simultaneously indicate that the messages have not all been sent and that there is a defect in the bus, in a combined action. Or, the determination of whether there is a bad connection could precede the determination of whether all of the messages have been sent. Bus slaves could self-determine an identifier based on bus master messages, and report this identifier back to the bus master in some embodiments. The bus master could compare the self-determined and reported identifiers with a list of expected identifiers and determine if there is a bad connection. Reports back from bus slaves could guide to the bus master as to whether to continue sending messages and/or identifiers. These and further variations of the method are readily devised.

After completing either action 812 or action 816, the second end of the bus remains coupled to the bus master, and the configuration of all of the bus slaves is complete (in this zero or single fault scenario). Flow continues with the action 818, in which further messages are transmitted and received to or from the bus slaves via the first and second ends of the bus. This is possible because the bus master can communicate to the bus slaves on one side of the fault from the first end of the bus, and can communicate to the slaves on the other side of the fault from the second end of the bus, in the case where there is a fault on the bus, such as a break in a wire between two slaves. The bus master can communicate with the bus slaves from both directions in the case of a bus without a fault, with the bus acting as an unbroken ring. In other fault scenarios, communication and activity of the bus slaves degrades gracefully, with the bus master able to communicate with bus slaves that are upstream of any faults via the first end of the bus, and with the bus master able to communicate with the bus slaves that are downstream of any faults via the second end 720 of the bus. As an example, the action 818 could be accomplished with a loop and a branch question. After the action 818, flow arrives at an endpoint 820. Other actions such as communications to or from the bus master or to or from the bus slaves could be performed before or after the endpoint 820.

The bus system of FIGS. 7 and 8 provides fault tolerance from an open circuit, as discussed above. A daisy chain bus, without ability to couple a second end of the bus to a bus master, would be vulnerable to a single point of failure. The above-discussed circuit allows operation even when there is an open circuit somewhere in the communication bus. The circuit provides a technique to allow diagnostics to detect the location of the fault. A single receiver in the bus master provides the same DC loading regardless of whether or not there is a fault on the communication bus. The system makes use of one set of receiver logic, such as a UART, in the bus master. By contrast, a bus master with a dual transceiver setup, i.e., one transceiver attached to the first end of the bus, and a second transceiver attached to the second end of the bus, would express a double load on the bus if there were no fault, and a single load if there were a break. This double load could have twice the capacitance and half the resistance due to parallel loads in the no-fault case. In comparison, the single load of the present circuit expresses the same impedance on the bus whether there is or is not a break fault on the bus.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A communication bus system, comprising:
a communication bus having a plurality of isolatable segments that are coupled and decoupled to the communication bus by a plurality of switches, wherein the plurality of switches are powered or operated by a plurality of charge pumps coupled to the communication bus and wherein the plurality of charge pumps are configured to detect activity on the communication bus;

a bus master having a first port coupled to a first end of the communication bus, the bus master configured to couple the first port, via a switch, to a second port of the bus master coupled to a second end of the communication bus and to decouple the first port from the second port and the second end of the communication bus based on a selection signal;

the switch configured to have a closed state, responsive to a first state of the selection signal, with the bus master coupled to and communicative with the first end of the communication bus via the first port and the bus master communicative with and coupled via the first port and the closed switch to the second port and the second end of the communication bus;

the switch configured to have an open state, responsive to a second state of the selection signal, with the first port coupled to the first end of the communication bus and the first port decoupled, via the open switch, from the second port and the second end of the communication bus;

the bus master having a differential amplifier coupled to a resistor ladder that biases the communication bus to a specified differential voltage that is received by the differential amplifier, wherein the resistor ladder coupled to the first port and second port establishes about 0.9V on the communication bus at a bus idle state and establishes a termination impedance of the communication bus; and the differential amplifier, having differential inputs coupled to the first port and the second port, converts the specified differential voltage to a logical zero or a logical one.

2. The communication bus system of claim 1, further comprising:
a plurality of bus slaves coupled along the communication bus, each bus slave of the plurality of bus slaves having one of the plurality of switches, wherein a first terminal of the one of the plurality of switches is coupled to a first isolatable segment of the communication bus and a second terminal of the one of the plurality of switches is coupled to a second isolatable segment of the communication bus.

3. The communication bus system of claim 1, wherein the bus master is coupled to each wire of the communication bus through the switch.

4. The communication bus system of claim 1, further comprising:
a plurality of bus slaves coupled along the communication bus, each bus slave of the plurality of bus slaves configured to receive communication from either of two of the segments to which the slave is coupled, irrespective of whether the two of the segments are decoupled from each other by the slave.

5. The communication bus system of claim 1, further comprising:
the bus master is configured to communicate with a first one of a plurality of bus slaves via the first end of the communication bus while the bus master is decoupled from the second end of the communication bus; and
the bus master is configured to communicate with a second one of the plurality of bus slaves via the second end of the communication bus while the bus master is coupled to the second end of the communication bus, regardless of whether the communication bus is severed between the first one of the plurality of bus slaves and the second one of the plurality of bus slaves.

6. The communication bus system of claim 1, wherein the communication bus system comprises:
a plurality of bus slaves coupled to the communication bus, each bus slave of the plurality of bus slaves having back-to-back PMOSFETs (P type metal oxide semiconductor field effect transistors) coupled to the isolatable segments of the communication bus as one of the plurality of switches; and
each bus slave of the plurality of bus slaves having one of the plurality of charge pumps coupled to the communication bus and coupled to a midpoint of the back-to-back PMOSFETs.

7. The communication bus system of claim 1, wherein:
the bus master includes a double pole switch, as the switch, coupled via the second port to the second end of the communication bus, with the first port of the bus master being decoupled from the second end of the communication bus when the double pole switch is open; and
each of the plurality of bus slaves includes a single pole switch, as one of the plurality of switches, coupled to the segments of the communication bus, with the segments of the communication bus being decoupled when the single pole switch is open.

8. The communication bus system of claim 1, wherein the bus master includes:
the switch, coupled to the first port and the second port.

9. A communication bus system, comprising:
a communication bus having a ring topology;
a bus master coupled by a first port to a first end of the communication bus, with a second port of the bus master coupled to a second end of the communication bus, the bus master having a first switch configured couple the first port to the second port of the bus master and to selectably break the ring topology by decoupling the first port of the bus master from the second port of the bus master while the bus master remains in communication with the communication bus via the first port;
the first switch configured to close responsive to a first state of a selection signal so that the bus master is communicative with and coupled to the first end of the communication bus via the first port and the bus master is communicative with and coupled via the first port and the closed first switch to the second port and the second end of the communication bus;
the first switch configured to open responsive to a second state of the selection signal so that the bus master is coupled to the first end of the communication bus via the first port and the bus master and the first port are decoupled, via the open first switch, from the second port and the second end of the communication bus;
a plurality of bus slaves coupled to the communication bus, each slave of the plurality of bus slaves having a switch configured, through a charge pump coupled to the communication bus and configured to detect activity on the communication bus, to couple and decouple neighboring segments of the communication bus;
the bus master having a differential amplifier coupled to a resistor ladder that biases the communication bus to a specified differential voltage that is received by the differential amplifier, wherein the resistor ladder coupled to the first port and second port establishes about 0.9V on the communication bus at a bus idle state and establishes a termination impedance of the communication bus; and the differential amplifier, having differential inputs coupled to the first port and the second port, converts the specified differential voltage to a logical zero or a logical one.

10. The communication bus system of claim 9, wherein:
the first switch has terminals coupled by the first port to a first segment of the communication bus and has terminals coupled by the second port to a second segment of the communication bus and;
the bus master is coupled to the first segment of the communication bus.

11. The communication bus system of claim 9, wherein the first switch includes a plurality of switches, wherein one of the plurality of switches is dedicated to a wire of the communication bus.

12. The communication bus system of claim 9, wherein each bus slave of the plurality of bus slaves comprises:
a first diode coupled from a wire of a first segment of the communication bus to a receiver terminal of the bus slave; and
a second diode coupled from a wire of a second segment of the communication bus to the receiver terminal of the bus slave.

13. The communication bus system of claim 9, wherein:
the switch configured to couple and decouple neighboring segments includes back-to-back PMOSFETs (P type metal oxide semiconductor field effect transistors) coupled to the neighboring segments of the communication bus.

14. The communication bus system of claim 9, further comprising:
a switch control that operates the switch configured to couple and decouple neighboring segments; and
the switch configured to couple and decouple neighboring segments, and the switch control, wherein the charge pump provides electrical power to the switch control.

15. The communication bus system of claim 9, further comprising:
an optoisolator coupled to the communication bus and the switch configured to couple and decouple neighboring segments, the optoisolator configured to operate the switch configured to couple and decouple the neighboring segments of the communication bus.

16. A method of operating a communication bus, comprising:
decoupling, as a result of inactivity on the communication bus, isolatable segments of the communication bus that are coupled by a plurality of switches, wherein the plurality of switches are powered or operated by a plurality of charge pumps coupled to the communication bus and configured to detect activity on the communication bus;
opening a switch so as to decouple a first port of a bus master from a second port of the bus master and a first end of a communication bus, wherein the bus master has a differential amplifier coupled to a resistor ladder;
biasing the communication bus to a specified differential voltage that is received by the differential amplifier;
transmitting a message to one of a plurality of bus slaves via the first port and a second end of the communication bus, with the decoupling from the first end of the communication bus being maintained; and
closing the switch so as to couple the first port to the second port and the first end of the communication bus, with the bus master communicative with the second port and the first end of the communication bus via the first port and the closed switch and with the first port bus master remaining coupled to and communicative with the second end of the communication bus via the first port.

17. The method of claim 16, further comprising:
iteratively transmitting messages to next ones of the plurality of bus slaves via the second end of the communication bus until either all of the messages have been successfully sent to the bus slaves or a bad connection is encountered;
determining whether the bad connection is encountered; and
iteratively transmitting at least a subset of the messages to at least a subset of the plurality of bus slaves in reverse order via the first end of the communication bus, in response to a determination that the bad connection is encountered.

18. The method of claim 16, further comprising:
communicating with the plurality of bus slaves via the second end of the communication bus and the first end of the communication bus, after the configuring and the coupling.

19. The method of claim 16, wherein decoupling from the first end of the communication bus and coupling to the first end of the communication bus include operating a switch that decouples the first port of the bus master from the second port of the bus master and the first end of the communication bus and couples the first port of the bus master to the second port of the bus master and the first end of the communication bus.

20. The method of claim 16, further comprising:
routing a transmission expressed on the first end of the communication bus through a bypass device to a receiver of one of the plurality of bus slaves.

* * * * *